(12) United States Patent
Potter (10) Patent No.: US 8,963,699 B2
(45) Date of Patent: Feb. 24, 2015

(54) CATALYTIC CONVERTER THEFT PROTECTION ARRANGEMENT

(71) Applicant: David P. Potter, Indianapolis, IN (US)

(72) Inventor: David P. Potter, Indianapolis, IN (US)

(*) Notice: Subject to any disclaimer, the term of this patent is extended or adjusted under 35 U.S.C. 154(b) by 0 days.

(21) Appl. No.: 13/890,204

(22) Filed: May 8, 2013

(65) Prior Publication Data
US 2013/0300550 A1 Nov. 14, 2013

Related U.S. Application Data

(60) Provisional application No. 61/644,319, filed on May 8, 2012.

(51) Int. Cl.
*B60R 25/10* (2013.01)
*B60R 25/20* (2013.01)

(52) U.S. Cl.
CPC .................................. *B60R 25/20* (2013.01)
USPC .... 340/426.26; 70/57.1; 248/551; 340/426.1; 340/426.24; 340/426.34

(58) Field of Classification Search
USPC ................... 340/429, 426.1, 426.18, 426.26, 340/426.24, 426.34; 248/551, 58, 317; 70/57.1, 273, 14, 18, 58; 180/287, 309; 60/299
See application file for complete search history.

(56) References Cited

U.S. PATENT DOCUMENTS

| 4,690,240 | A * | 9/1987 | Russo | 180/287 |
| 2006/0087411 | A1 * | 4/2006 | Chang | 340/426.18 |
| 2010/0258703 | A1 * | 10/2010 | Meislahn | 248/551 |
| 2011/0036130 | A1 * | 2/2011 | Hisler | 70/57.1 |
| 2011/0253471 | A1 * | 10/2011 | Dusa, II | 180/287 |

* cited by examiner

*Primary Examiner* — Brent Swarthout
(74) *Attorney, Agent, or Firm* — Keith J. Swedo; Bingham Greenebaum Doll LLP (57) ABSTRACT

A catalytic converter theft protection arrangement includes a metal cage rigidly attached to an underside of a vehicle such that the cage surrounds a catalytic converter of the vehicle. An electronic tamper-detecting device is disposed within the cage and transmits an alarm signal in response to detecting motion around the catalytic converter and/or vibration of the cage. A remote controller selectively activates and deactivates the electronic tamper-detecting device in response to actuation of the remote controller by a user.

20 Claims, 6 Drawing Sheets

CATALYTIC CONVERTER THEFT PROTECTION ARRANGEMENT

BACKGROUND OF THE INVENTION

1. Field of the Invention

The present invention relates to a system for preventing theft of catalytic converters from vehicles.

2. Description of the Related Art

Catalytic converters include valuable platinum, and are increasingly being stolen from motor vehicles. The converters are exposed on the underside of the vehicles. Thieves merely cut the pipe leading into the converter and the pipe leading out of the converter in order to detach the converter and walk away with it.

SUMMARY OF THE INVENTION

The invention is directed to an arrangement including a metal cage surrounding the converter. The cage is attached to the underside of the vehicle. An electronic tamper-detecting device including a motion detector and/or a vibration sensor is attached to an inner surface of the cage and sets off an alarm if the cage is tampered with. The tamper-detecting device is armed and disarmed remotely by use of a key fob.

The invention comprises, in one form thereof, a catalytic converter theft protection arrangement including a metal cage rigidly attached to an underside of a vehicle such that the cage surrounds a catalytic converter of the vehicle. An electronic tamper-detecting device is disposed within the cage and transmits an alarm signal in response to detecting motion around the catalytic converter and/or vibration of the cage. A remote controller selectively activates and deactivates the electronic tamper-detecting device in response to actuation of the remote controller by a user.

The invention comprises, in another form thereof, a catalytic converter theft protection arrangement including an enclosure having five substantially rectangular sides. The sides include a front side, a back side, a bottom side, a left side and a right side. The front side and the back side each includes a respective upper edge with a respective slot therein. At least one tamper proof fastener is attached to at least one of the front side, the back side, the left side and the right side of the enclosure. The fastener rigidly attaches the enclosure to an underside of a vehicle such that the enclosure substantially surrounds a catalytic converter of the vehicle. An input pipe of the catalytic converter is received in the slot of the front side, and an output pipe of the catalytic converter is received in the slot of the back side.

The invention comprises, in yet another form thereof, a catalytic converter theft protection arrangement including a metal enclosure rigidly attached to an underside of a vehicle such that the enclosure surrounds a catalytic converter of the vehicle. The enclosure has a front corner defined by three substantially flat surfaces of the enclosure. An electronic tamper-detecting device has a housing with two outer substantially flat surfaces oriented at an angle of approximately ninety degrees to each other. The tamper-detecting device is disposed within the front corner of the enclosure such that each of the two outer substantially flat surfaces of the housing physically contacts a respective one of the three substantially flat surfaces of the enclosure. The tamper-detecting device transmits an alarm signal in response to detecting motion around the catalytic converter and/or vibration of the enclosure.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Figure 1:
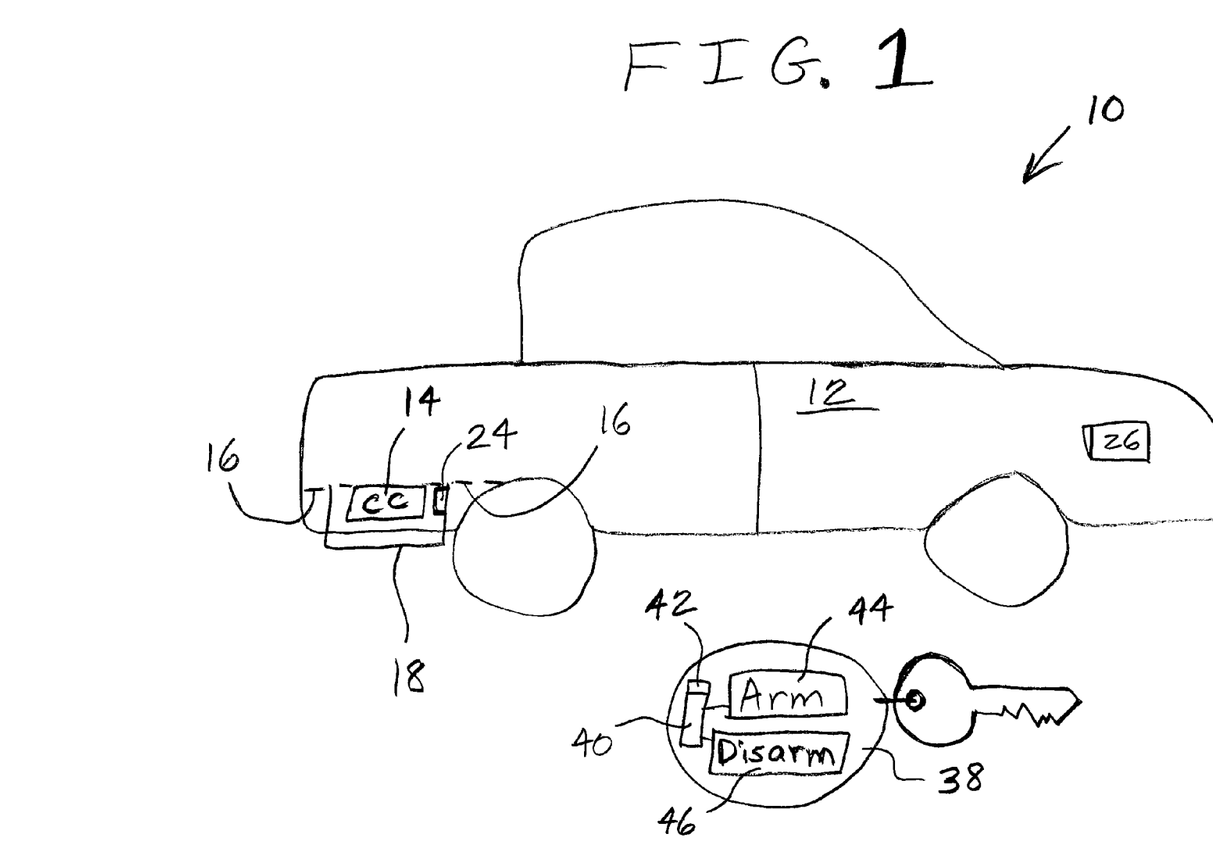
FIG. 1 is a side view of a vehicle incorporating one embodiment of the Catalytic Converter Theft Protection Arrangement of the invention.

FIG. 1 illustrates one embodiment of a catalytic converter theft protection arrangement 10 of the invention incorporated with a vehicle 12. Vehicle 12 includes a conventional catalytic converter 14 that is attached generally along an underside 16 of vehicle 12. According to the invention, a metal cage 18 surrounds converter 14 and is rigidly attached to underside 16. In one embodiment, cage 18 is formed of steel and includes a skeleton or frame 20 (FIG. 2) made of bars or posts approximately an inch thick, and which is rigidly bolted or welded to underside 16 of vehicle 12. Cage 18 includes metal wire meshes 22 extending along the outer boundary of cage 18 between the adjacent bars of frame 20. Only one mesh 22 is shown, and is only fragmentarily shown, in order to avoid obscuring the other components. However, it is to be understood that the meshes fill the gaps between the bars of frame 20 such that it is not possible for a person to insert his hand or a cutting tool within cage 18 so as to remove converter 14 from vehicle 12. The bars of frame 20 and meshes 22 may all be welded together.

Figure 2:
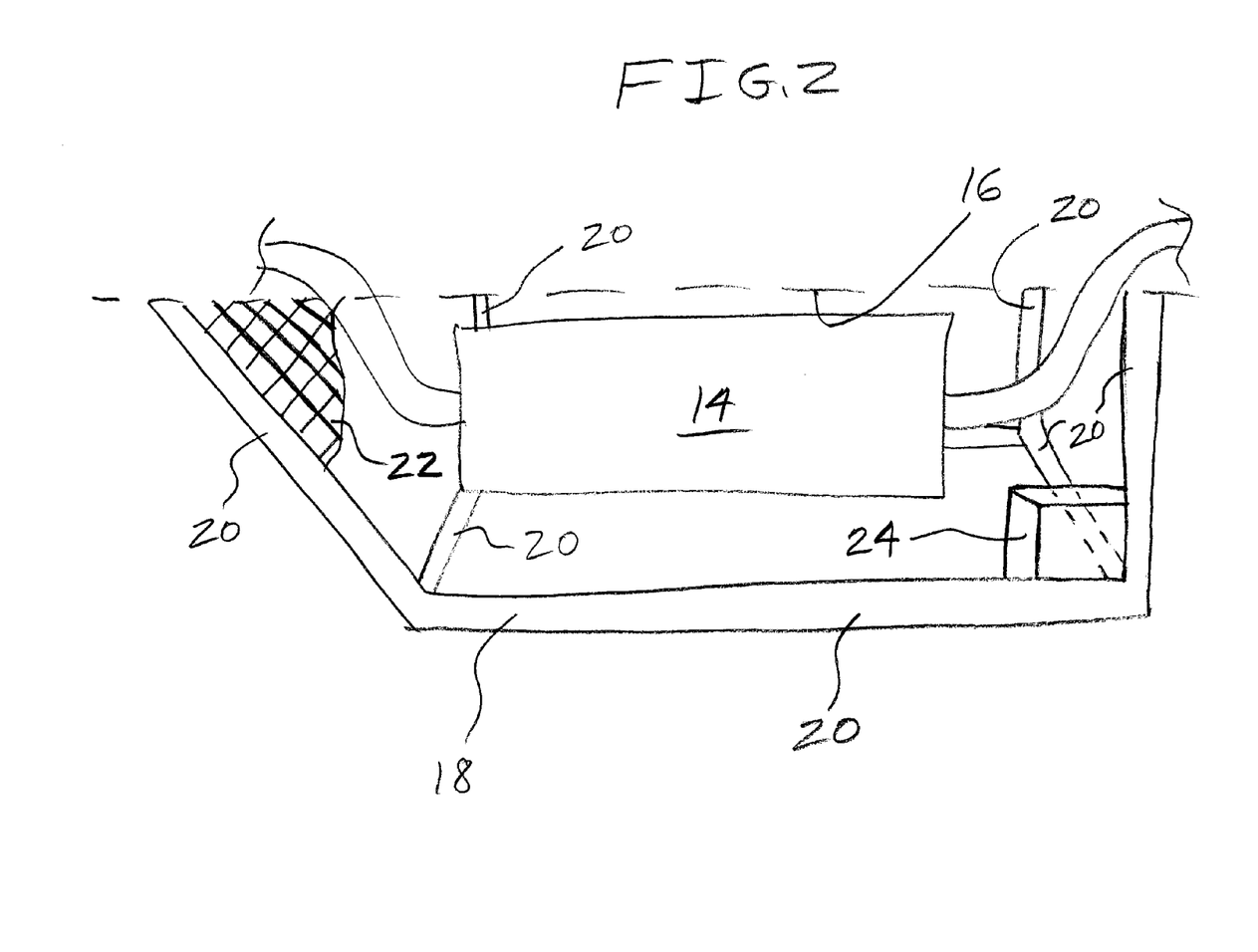
FIG. 2 is an enlarged side view of the cage and the electronic tamper-detecting device of the Catalytic Converter Theft Protection Arrangement of FIG. 1.
Figure 3:
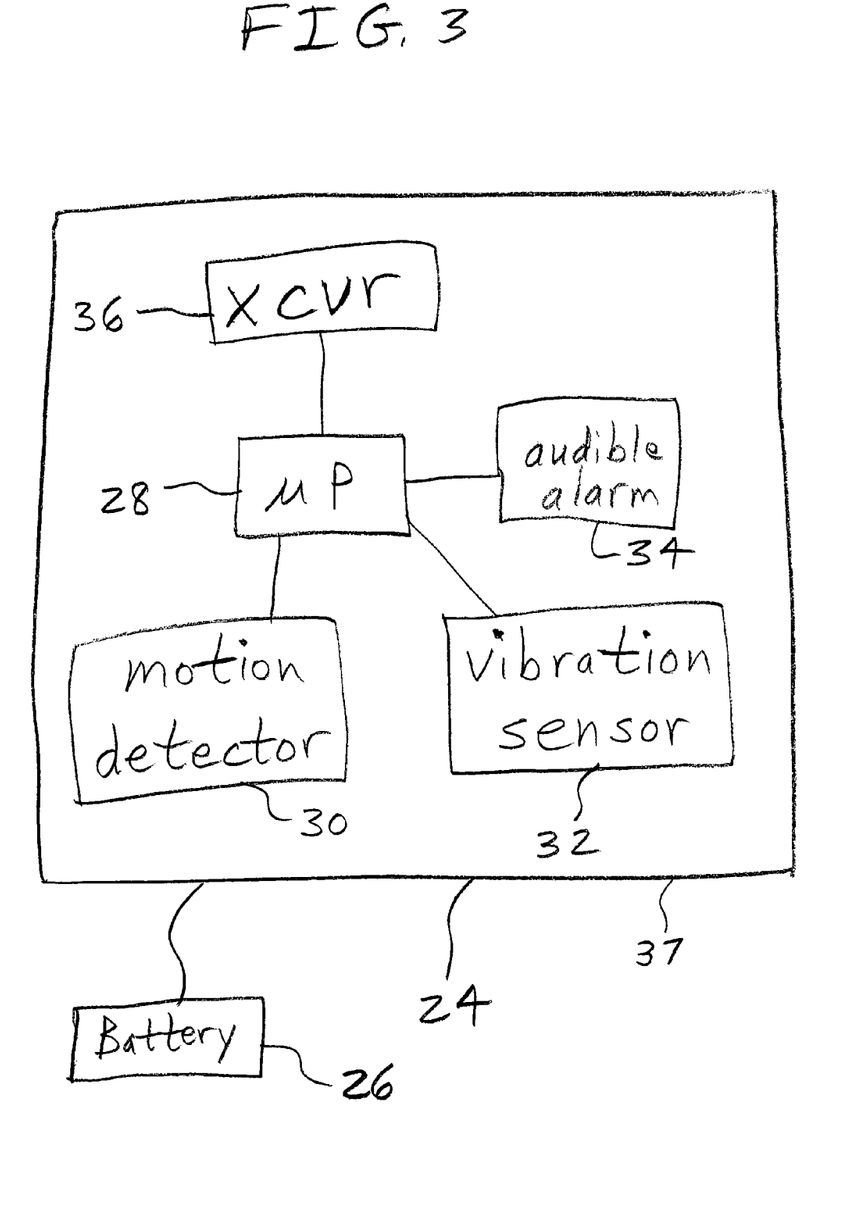
FIG. 3 is a block diagram of the electronic tamper-detecting device of the arrangement of FIG. 1.

Disposed within and attached to cage 18 is an electronic tamper-detecting device 24, the details of which are shown in FIG. 3. Device 24 may be powered via a hard wire connection to a battery 26 of vehicle 12. Device 24 includes a processor 28, a motion detector 30, a vibration sensor 32, an audible alarm or siren 34, and a radio frequency transceiver 36 for communication with a battery-powered key fob 38 operated by a user of vehicle 12.

Device 24 may include a housing 37 that contains each of processor 28, motion detector 30, vibration sensor 32, audible alarm or siren 34, and radio frequency transceiver 36. Housing 37 may be formed of metal or of some heat-resistant non-metal material. Housing 37 may be rectangularly-shaped, and may have six rectangular sides such that there are large areas of physical contact between flat surfaces of cage 18 and flat surfaces of housing 37. Thus, cage 18 may function as a heat sink for device 24, and thus may prevent device 24 from overheating.

In one embodiment, device 24 includes either motion detector 30 or vibration sensor 32 but not both. Vibration sensor 32 may be attached to cage 18 such that vibration sensor 32 is particularly sensitive to vibration of cage 18.

Device 24 may be mounted at a location within cage 18 that is as far away as possible from converter 14 as possible. Thus, damage to device 24 from the heat produced by converter 14 may be avoided. As shown in FIG. 2, device 24 is accordingly placed in a corner of cage 18 that is as far away as possible from converter 14 as possible.

Key fob 38 includes a processor 40, an RF transceiver 42, an "arm" pushbutton 44 and a "disarm" pushbutton 46.

In another embodiment, the electronic tamper-detecting device may be hardwired to, or otherwise in communication with, an overall vehicle alarm system such that tamper-detecting device may share the audible alarm, processor, and/or transceiver of the overall vehicle alarm system, and tamper-detecting device does not have its own dedicated audible alarm, processor, and/or transceiver. In this embodiment, the tamper-detecting device may include only a motion detector and/or a vibration sensor which is connected to the overall vehicle alarm system.

During use, when the user is ready to leave or walk away from vehicle 12 with device 24 in the unarmed state, the user arms device 24 by pressing an "arm" pushbutton 44 on key fob 38. In response to the pressing of pushbutton 44, processor 40 causes transceiver 42 to transmit an RF arming signal that is received by transceiver 36. In response to transceiver 36 receiving the arming signal, processor 28 turns on or activates motion sensor 30 and/or vibration sensor 32. In the event that a thief attempts to remove converter 14 and starts by touching cage 18 with his hand or a tool, vibration sensor 32 detects the vibration of cage 18 and transmits a vibration signal to processor 28. Processor 28 then causes audible alarm 34 to emit a loud noise, such as a siren, that is loud enough to alert people in the vicinity that a crime may be occurring. In addition, or alternatively, processor 28 may cause transceiver 36 to transmit an RF signal to alert the user or police. For example, transceiver 36 may transmit a cellular telephone signal to the user's telephone, to local police, or to the local 911 emergency phone number.

Moreover, when the thief crawls under vehicle 12, motion detector 30 may detect the motion of the thief and transit a motion signal to processor 28. Processor 28 then causes audible alarm 34 to emit a loud noise, such as a siren, that is loud enough to alert people in the vicinity that a crime may be occurring. In addition, or alternatively, processor 28 may cause transceiver 36 to transmit an RF signal to alert the user or police. For example, transceiver 36 may transmit a cellular telephone signal to the user's telephone, to local police, or to the local 911 emergency phone number.

When the user is approaching vehicle 12 in the armed state and intends to touch or operate vehicle 12, then the user presses disarm pushbutton 46 in order to turn off or temporarily disable device 24. Thus, the user may drive vehicle 12 without causing an audible or RF alarm signal to be transmitted. When the user has parked vehicle 12 and is ready to walk away from vehicle 12, then the user again arms device 24 by pressing arm pushbutton 44.

Figure 4:
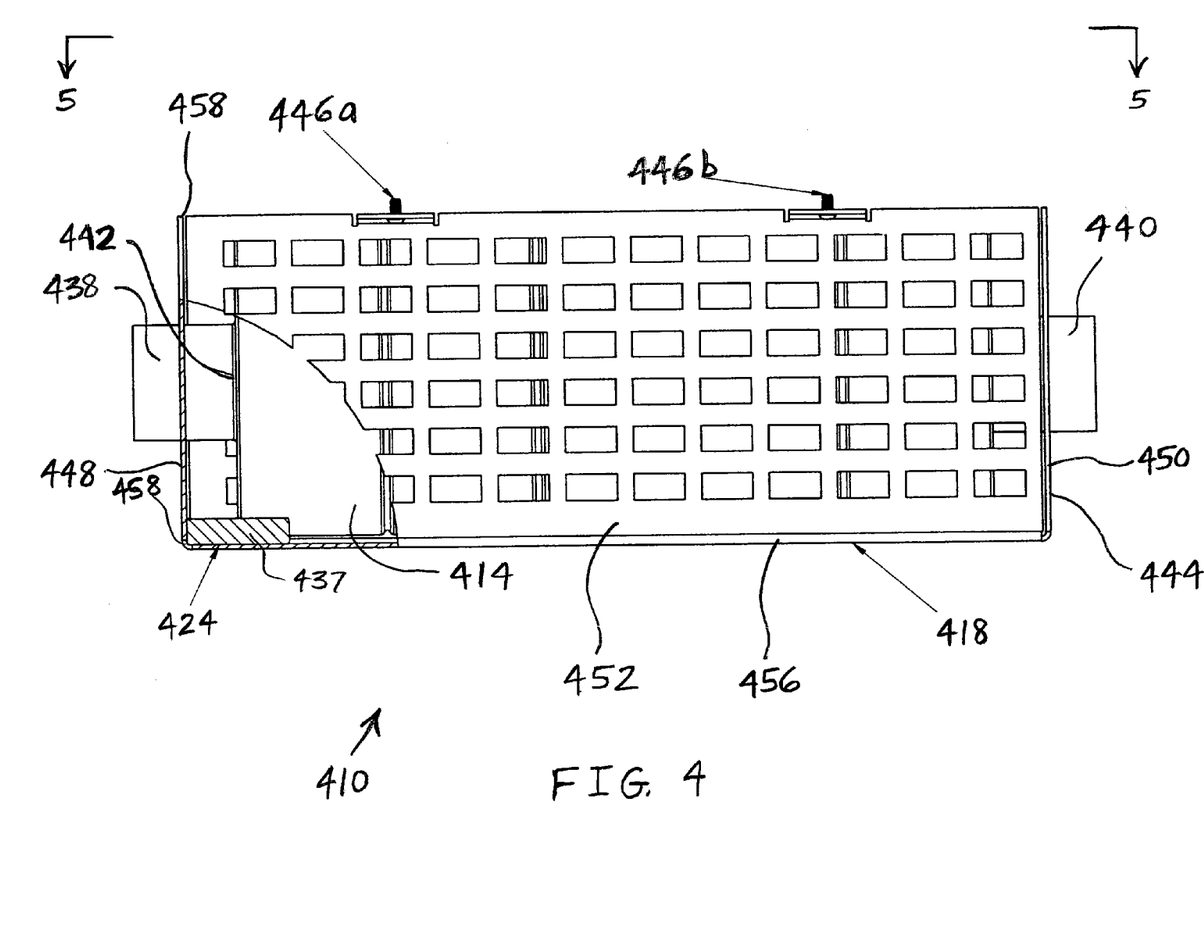
FIG. 4 is a side view of another embodiment of the Catalytic Converter Theft Protection Arrangement of the invention.
Figure 5:
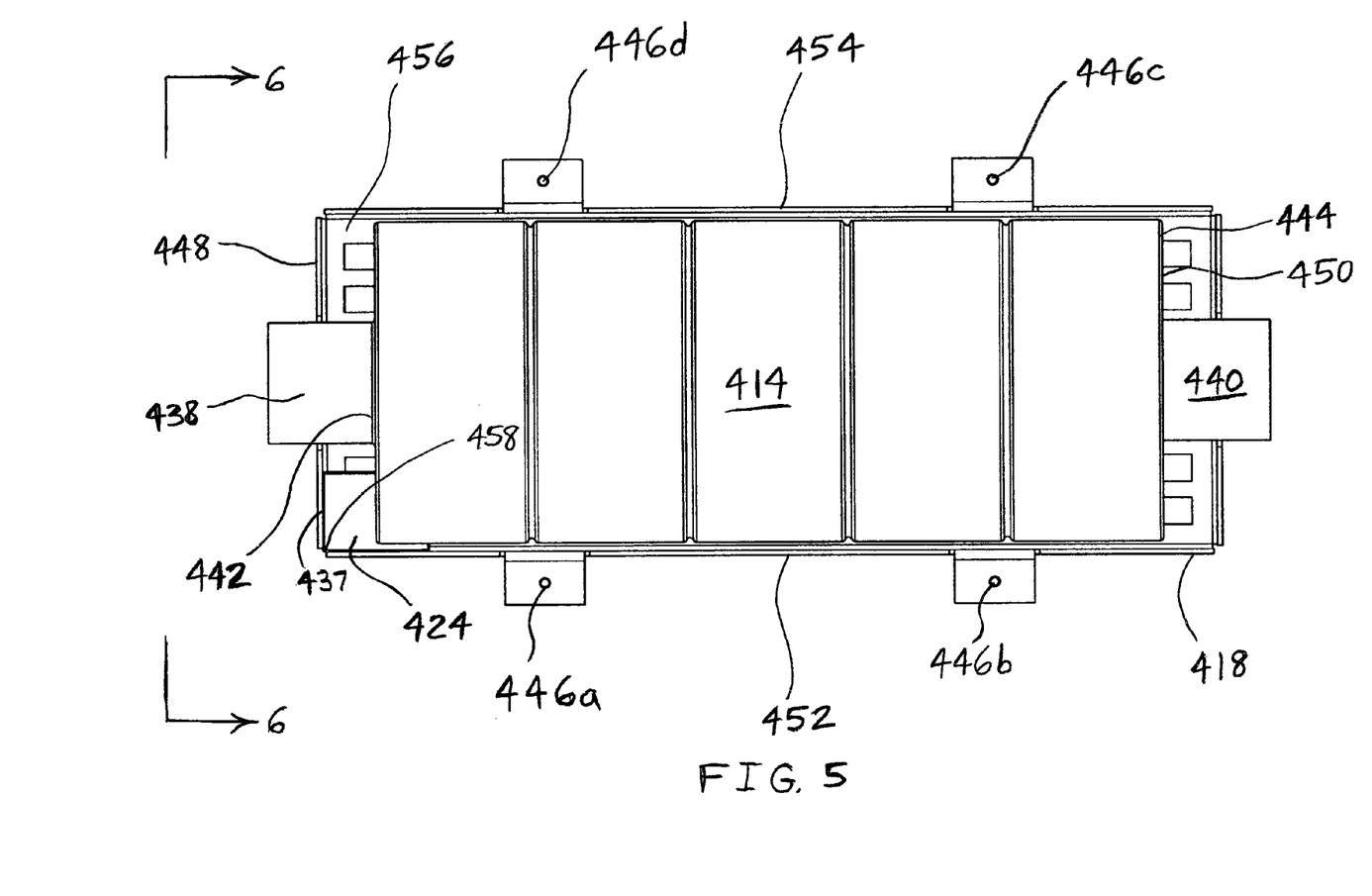
FIG. 5 is a top view of the Catalytic Converter Theft Protection Arrangement of FIG. 4 along line 5-5.
Figure 6:
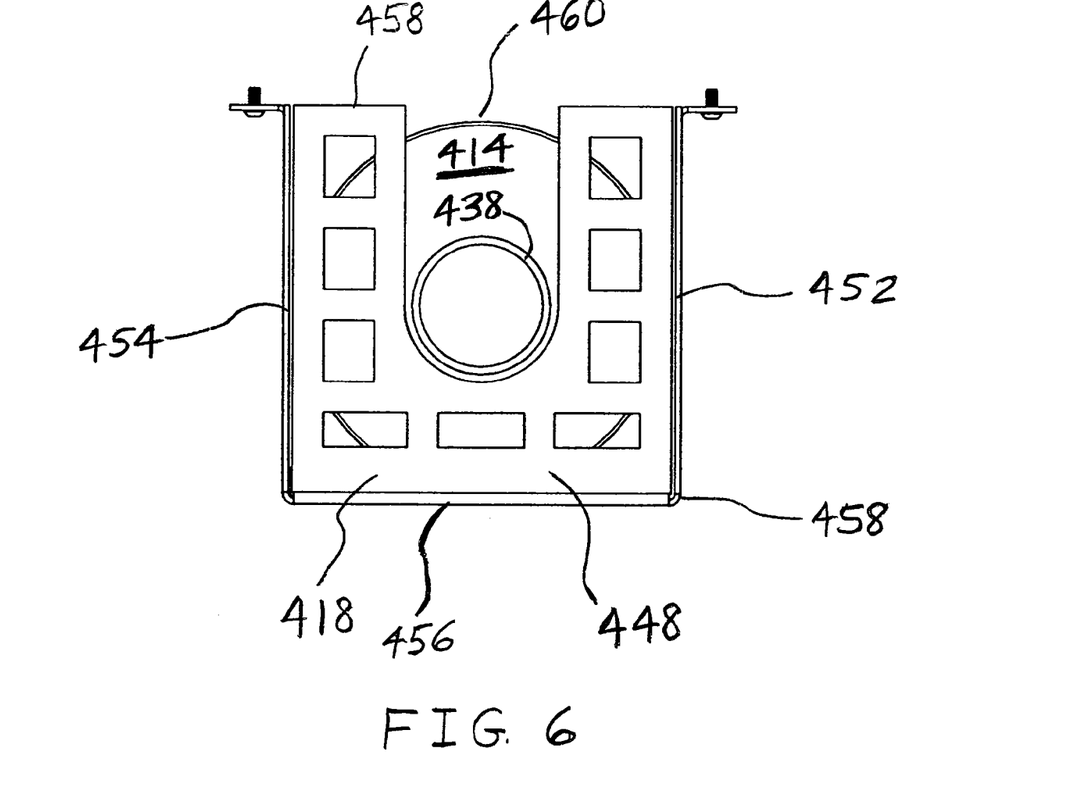
FIG. 6 is a front view of the Catalytic Converter Theft Protection Arrangement of FIG. 5 along line 6-6.

Another embodiment of a catalytic converter theft protection arrangement 410 of the invention incorporated with a motor vehicle is illustrated in FIGS. 4-6. A catalytic converter 414 includes an input pipe 438 and an output pipe 440, each of which being attached generally to an underside of the vehicle. Gaseous engine exhaust may flow into a front end 442 of converter 414 through input pipe 438, and out a back end 444 of converter 414 through output pipe 440.

According to the invention, a perforated sheet metal enclosure 418 surrounds converter 414 and is rigidly attached to the underside of the vehicle by four tamper proof fasteners 446a-d, as shown in FIG. 5. In one embodiment, enclosure 418 is formed of steel and includes a front wall 448, a back wall 450, a left side wall 452, a right side wall 454 and a bottom wall 456. Thus, enclosure 418 may be substantially rectangularly-shaped, and may have five flat, rectangular sides.

An upper edge 458 of front wall 448 may include a slot 460 which receives input pipe 438. An upper edge of back wall 450 may also include a slot (not shown) similar to slot 460, which receives output pipe 440. These slots may enable enclosure 418 to cover converter 414, and thus be installed as an aftermarket item after converter 414 has already been permanently installed in the vehicle. Thus, it is not possible for a person to insert his hand or a cutting tool within enclosure 418 so as to remove converter 414 from the vehicle, even if the person were to cut completely through input pipe 438 and output pipe 440.

Disposed within and attached to enclosure 418 is an electronic tamper-detecting device 424, the details of which may be similar to those of tamper-detecting device 24, as shown in FIG. 3. Device 424 may be powered via a hard wire connection to a battery of the vehicle. Device 424 may include a processor, a motion detector, a vibration sensor, an audible alarm or siren, and a radio frequency transceiver for communication with a battery-powered key fob operated by a user of the vehicle. In one embodiment, device 424 includes either a motion detector or a vibration sensor but not both. The vibration sensor may be attached to enclosure 418 such that the vibration sensor is particularly sensitive to vibration of enclosure 418.

Device 424 may be mounted at a front corner location within enclosure 418, as shown in FIGS. 4-5, in order to place device 424 as far away as possible from the rear portion of converter 414, which may be the hottest part of converter 414. Thus, damage to device 424 from the heat produced by the rear portion of converter 414 may be avoided. Generally, device 424 may be accordingly placed in a corner of enclosure 418 that is as far away as possible from the rear portion of converter 414.

Device 424 may include a housing 437 that may contain each of the processor, the motion detector, the vibration sensor, the audible alarm or siren, and the radio frequency transceiver. Housing 437 may be formed of metal or of some heat-resistant non-metal material. Housing 437 may be rectangularly-shaped, and may have six rectangular, flat sides such that there are large areas of physical contact between flat surfaces of enclosure 418 and flat surfaces of housing 437. Thus, enclosure 418 may function as a heat sink for device 424, and thus may prevent device 424 from overheating.

Enclosure 418 has a front corner 458 defined by three substantially flat inner surfaces of front wall 448, bottom wall 456 and left wall 452. Housing 437 includes six outer flat surfaces, with each surface being oriented at an angle of approximately ninety degrees to two other ones of the six surfaces. Housing 437 of tamper-detecting device 424 is disposed within front corner 458 of enclosure 418 such that each of three outer substantially flat surfaces of housing 437 physically contacts and is flush against a respective one of the three substantially flat inner surfaces of front wall 448, bottom wall 456 and left wall 452. This configuration provides large areas of contact between enclosure 418 and housing 437, and thus enables enclosure 418 to carry a large amount of heat away from housing 437.

In another embodiment, the electronic tamper-detecting device may be hardwired to, or otherwise in communication with, an overall vehicle alarm system such that tamper-detecting device may share the audible alarm, processor, and/or transceiver of the overall vehicle alarm system, and tamper-detecting device does not have its own dedicated audible alarm, processor, and/or transceiver. In this embodiment, the tamper-detecting device may include only a motion detector and/or a vibration sensor which is connected to the overall vehicle alarm system.

While this invention has been described as having an exemplary design, the present invention may be further modified within the spirit and scope of this disclosure. This application is therefore intended to cover any variations, uses, or adaptations of the invention using its general principles.

What is claimed is:

1. A catalytic converter theft protection arrangement, comprising:
   a metal cage configured to be rigidly attached to an underside of a vehicle such that the cage surrounds a catalytic converter of the vehicle, the metal cage including a first flat surface;
   an electronic tamper-detecting device including a housing having a second flat surface, the electronic tamper-detecting device being disposed within the cage and configured to transmit an alarm signal in response to detecting at least one of:
      motion around the catalytic converter; and
      vibration of the cage; and
   a remote controller configured to selectively activate and deactivate the electronic tamper-detecting device in response to actuation of the remote controller by a user, wherein the second flat surface of the housing is in physical contact with the first flat surface of the metal cage such that the metal cage is configured to carry heat away from the housing.

2. The arrangement of claim 1, wherein the tamper-detecting device is disposed in a corner of the cage.

3. The arrangement of claim 1, wherein the tamper-detecting device is attached to the cage at a location within the cage that maximizes a distance between the tamper-detecting device and the catalytic converter.

4. The arrangement of claim 1, wherein the tamper-detecting device is configured to activate an audible alarm in response to detecting at least one of:
   motion around the catalytic converter; and
   vibration of the cage.

5. The arrangement of claim 1, wherein the cage is formed of perforated sheet metal.

6. The arrangement of claim 1, wherein the cage includes:
   a front wall having a first upper edge with a slot receiving an input pipe connected to the catalytic converter; and
   a back wall having a second upper edge with a slot receiving an output pipe connected to the catalytic converter.

7. The arrangement of claim 1, further comprising a plurality of tamper-proof fasteners attaching the cage to the underside of the vehicle.

8. The arrangement of claim 1, wherein the tamper-detecting device is configured to transmit a radio frequency signal to a civic authority in response to detecting at least one of:
   motion around the catalytic converter; and
   vibration of the cage.

9. A catalytic converter theft protection arrangement, comprising:
   a metal enclosure configured to be rigidly attached to an underside of a vehicle such that the enclosure surrounds a catalytic converter of the vehicle, the enclosure having a front corner defined by three substantially flat surfaces of the enclosure;
   an electronic tamper-detecting device having a housing with two outer substantially flat surfaces oriented at an angle of approximately ninety degrees to each other, the tamper-detecting device being disposed within the front corner of the enclosure such that each of the two outer substantially flat surfaces of the housing physically contacts a respective one of the three substantially flat surfaces of the enclosure such that the enclosure is configured to carry heat away from the housing, the tamper-detecting device being configured to transmit an alarm signal in response to detecting at least one of:
      motion around the catalytic converter; and
      vibration of the enclosure.

10. The arrangement of claim 9, further comprising a remote controller configured to selectively activate and deactivate the electronic tamper-detecting device in response to actuation of the remote controller by a user.

11. The arrangement of claim 9, wherein the tamper-detecting device is disposed in a lower front corner of the enclosure.

12. The arrangement of claim 9, wherein the tamper-detecting device is attached to the enclosure at a location within the enclosure that maximizes a distance between the tamper-detecting device and the catalytic converter.

13. The arrangement of claim 9, wherein the enclosure is formed of perforated sheet metal.

14. A catalytic converter theft protection arrangement, comprising:
   a metal cage configured to be attached to an underside of a vehicle such that the cage substantially surrounds a catalytic converter of the vehicle, the metal cage including a first flat surface;
   an electronic tamper-detecting device including a housing having a second flat surface, the electronic tamper-detecting device being disposed within the cage and configured to transmit an alarm signal in response to detecting at least one of:
      motion around the catalytic converter; and
      vibration of the cage; and
   a remote controller configured to selectively activate and deactivate the electronic tamper-detecting device in response to actuation of the remote controller by a user, wherein the second flat surface of the housing is in physical contact with the first flat surface of the metal cage such that the metal cage is configured to carry heat away from the housing.

15. The arrangement of claim 14, wherein the tamper-detecting device is disposed in a corner of the cage that maximizes a distance between the tamper-detecting device and the catalytic converter.

16. The arrangement of claim 14, wherein the tamper-detecting device is configured to activate an audible alarm in response to detecting:
   motion around the catalytic converter; and/or
   vibration of the cage.

17. The arrangement of claim 14, wherein the tamper-detecting device is configured to transmit a radio frequency signal to a civic authority in response to detecting:
   motion around the catalytic converter; and/or
   vibration of the cage.

18. The arrangement of claim 14, wherein the cage is formed of perforated sheet metal.

19. The arrangement of claim 14, wherein the cage includes:
   a front wall having a first upper edge with a slot receiving an input pipe connected to the catalytic converter; and
   a back wall having a second upper edge with a slot receiving an output pipe connected to the catalytic converter.

20. The arrangement of claim 14, further comprising a plurality of tamper-proof fasteners attaching the cage to the underside of the vehicle.

\* \* \* \* \*